United States Patent
Hachisuka et al.

[11] Patent Number: 5,888,605
[45] Date of Patent: Mar. 30, 1999

[54] POLYSULFONE SEMIPERMEABLE MEMBRANE AND METHOD OF MANUFACTURING THE SAME

[75] Inventors: Hisao Hachisuka; Kenichi Ikeda, both of Osaka, Japan

[73] Assignee: Nitto Denko Corporation, Osaka, Japan

[21] Appl. No.: 738,267

[22] Filed: Oct. 25, 1996

[30] Foreign Application Priority Data

Oct. 31, 1995 [JP] Japan ................................. 7-308404

[51] Int. Cl.⁶ ................ B32B 3/00; B32B 7/02; B32B 5/20; B01D 39/00
[52] U.S. Cl. ............. 428/71; 210/500.41; 428/215; 428/318.8; 428/319.3
[58] Field of Search ................ 428/71, 215, 318.8, 428/319.3; 210/500.41

[56] References Cited

U.S. PATENT DOCUMENTS

| | | | |
|---|---|---|---|
| 4,880,441 | 11/1989 | Kesting et al. | 55/16 |
| 4,929,405 | 5/1990 | Kohn | 264/41 |
| 4,941,893 | 7/1990 | Hsieh et al. | 55/16 |
| 5,009,678 | 4/1991 | Bikson et al. | 55/16 |
| 5,049,169 | 9/1991 | Teramoto et al. | 55/158 |
| 5,061,301 | 10/1991 | Kim et al. | 55/158 |
| 5,071,448 | 12/1991 | Bikson et al. | 55/16 |

FOREIGN PATENT DOCUMENTS

| | | |
|---|---|---|
| 57-140608 | 8/1982 | Japan . |
| 64-58324 | 3/1989 | Japan . |
| 64-81823 | 3/1989 | Japan . |
| 3-72927 | 3/1991 | Japan . |
| 3-154625 | 7/1991 | Japan . |
| 3-196824 | 8/1991 | Japan . |

OTHER PUBLICATIONS

Kesting, et al., "The Second–Generation Polysulfone Gas--Separation Membrane. I. The Use of Lewis Acid: Base Complexes as Transient Templates to Increase Free Volume", *Journal of Applied Polymer Science*, vol. 40 (1990) pp. 1557–1574.

Kesting, et al., "The Second–Generation Polysulfone Gas--Separation Membrane. II. The Relationship between Sol Properties, Gel Macrovoids, and Fiber Selectivity", *Journal of Applied Polymer Science*, vol. 40 (1990) pp. 1575–1582.

Fritzsche, et al., "Polysulfone Hollow Fiber Membranes Spun from Aliphatic Acid ($C_2$–$C_4$): N–Methylpyrrollidone Complexes —Structure Determination by Oxygen Plasma Ablation", *Journal of Applied Polymer Science*, vol. 41 (1990) pp. 713–733.

*Primary Examiner*—Ponnathapura Achutamurthy
*Assistant Examiner*—Hankyel T. Park
*Attorney, Agent, or Firm*—Merchant, Gould, Smith, Edell, Welter & Schmidt

[57] ABSTRACT

The semipermeable membrane of polysulfone resin is formed of a continuous structure of a homogeneous skin layer part having an average thickness of 5 to 1000 nm and a porous layer which is made of the same material as that of the homogeneous skin layer and is thicker than the homogeneous skin layer, and the porous layer is formed of a structure having voids having an average pore diameter less than 3 $\mu$m. Therefore, a gas separation membrane that has high permeation flux and requires practically satisfactory cost can be provided. Diethylene glycol dimethyl ether was added to polysulfone for dissolution, and the resultant solution was defoamed for preparation. The solution was cast on a support layer of polyester non-woven fabric using an applicator, dipped in water as a solidifying liquid, and dried. As a result, a semipermeable membrane comprising a homogeneous skin layer part and a porous layer is obtained. A crosslinking silicone resin solution may be applied to the surface of the membrane to form a protective film.

7 Claims, 8 Drawing Sheets

| | |
|---|---|
| Maximum value : | 253.0 |
| Minimum value : | 198.0 |
| Average : | 238.389156 |
| Dispersion : | 176.774472 |
| Standard deviation : | 13.2956561 |
| Lower edge of first section : | 0.0 |
| Upper edge of last section : | 256.0 |
| Number of classes : | 256 |
| Vertical axis scale : | 1 |

FIG.5 (a)

| Maximum value : | 245.0 |
|---|---|
| Minimum value : | 22.0 |
| Average : | 130.888111 |
| Dispersion : | 4475.52128 |
| Standard deviation : | 66.8993369 |
| Lower edge of first section : | 0.0 |
| Upper edge of last section : | 256.0 |
| Number of classes : | 256 |
| Vertical axis scale : | 1 |

FIG.5 (b)

| | |
|---|---:|
| Maximum value : | 246.0 |
| Minimum value : | 1.0 |
| Average : | 170.295348 |
| Dispersion : | 4879.22672 |
| Standard deviation : | 69.8514618 |
| Lower edge of first section : | 0.0 |
| Upper edge of last section : | 256.0 |
| Number of classes : | 256 |
| Vertical axis scale : | 1 |

FIG.6 (a)

| | |
|---|---:|
| Maximum value : | 242.0 |
| Minimum value : | 4.0 |
| Average : | 131.620930 |
| Dispersion : | 6827.30514 |
| Standard deviation : | 82.6275083 |
| Lower edge of first section : | 0.0 |
| Upper edge of last section : | 256.0 |
| Number of classes : | 256 |
| Vertical axis scale : | 1 |

POLYSULFONE SEMIPERMEABLE MEMBRANE AND METHOD OF MANUFACTURING THE SAME

BACKGROUND OF THE INVENTION

The present invention relates to a polysulfone semipermeable membrane that has a specific membrane structure and a method of manufacturing the same by a wet phase conversion method using a specific solvent. More particularly, the invention relates to a membrane for gas separation, especially a polysulfone semipermeable membrane used for separating and concentrating specific components such as hydrogen, methane, carbonic acid gas, oxygen, nitrogen, steam, and acid gas from industrial mixed gases, or used for water processing, etc., and a method of manufacturing the same.

Polysulfone and a derivative thereof, etc. have been known as separation membrane materials that are inexpensive, chemically stable, and excellent in various properties such as mechanical strength and resistance. Such materials also have been examined in various fields of the separation membranes. Examples of the materials are disclosed in Laid-open Japanese Patent Application No. (Tokkai hei) 3-196824, Laid-open Japanese Patent Application No. (Tokkai hei) 3-72927, Laid-open Japanese Patent Application No. (Tokkai hei) 3-154625, Laid-open Japanese Patent Application No. (Tokkai hei) 1-81823, Laid-open Japanese Patent Application No. (Tokkai hei) 1-58324, U.S. Pat. No. 5,049,169, and U.S. Pat. No. 5,071,448.

Furthermore, considering a separation membrane having practical mechanical strength, a method of manufacturing a thin film or an asymmetric membrane has been examined. Examples of methods of manufacturing a thin film of polysulfone resin include methods of coating to a porous support membrane disclosed in U.S. Pat. No. 5,009,678, U.S. Pat. No. 4,941,893, etc., and methods of manufacturing an asymmetric membrane disclosed in U.S. Pat. No. 4,880,441, J. Appl. Polym. Sci., 40, 1557 (1990), J. Appl. Polym. Sci., 40, 1575 (1990), J. Appl. Polym. Sci., 41, 713 (1990), etc. However, when polymers having a high performance separation factor are formed on a suitable porous support membrane as a thin film, the thickness of the thin film should be desirably 0.1 $\mu$m or less so as to increase the permeation speed of gas to a practical level. Manufacturing such a thin film industrially results in complicated manufacturing processes, low yield, and high cost, and therefore it is not suitable for industrial practice. While sputtering etching (Laid-open Japanese Patent Application No. (Tokkai-sho) 57-140608) and a method of manufacturing an asymmetric membrane are also described in the above literature, it was difficult to industrially manufacture a membrane having a required thickness of 0.1 $\mu$m or less without a pinhole. U.S. Pat. No. 4,929,405 discloses a method in which the thickness of a homogeneous membrane of aromatic polyimide containing fluorine is controlled to 400 angstrom (40 nm) or less, which is a required thickness of 0.1 $\mu$m or less, by a method of spreading on a water surface (Langmuir-Blodgett). However, manufacturing such a membrane industrially was difficult.

In the above conventional methods, when manufacturing a semipermeable membrane practically and industrially using an inexpensive polysulfone resin to perform efficient separation operation, the above problems arose. Therefore it was difficult to obtain a satisfactory membrane structure, especially a gas separation membrane structure. Particularly, for a composite membrane, a thin film is formed on a porous support membrane, so that the dynamic strength at the interface is not enough. Therefore, in order to form a thin film without a defect which has gas separation function, filling in the pores of the porous support membrane, the thickness must be thick. For an asymmetric membrane, the membrane is integrally formed of a skin layer and a porous layer, so that no separation occurs at the interface, and the dynamic strength is enough. However, it was difficult to industrially form a skin layer without a defect which has gas separation function and has a thickness of 100 nm or less.

In order to solve the conventional problems as mentioned above, the present invention provides a polysulfone semipermeable membrane in which a gas separation membrane that has high permeation flux and can be produced for a satisfactory cost is formed by a more simple method. The present invention also provides a method of manufacturing the same.

SUMMARY OF THE INVENTION

In order to achieve the above objects, a polysulfone semipermeable membrane of the present invention comprises a semipermeable membrane of polysulfone resin formed of a continuous structure of a homogeneous skin layer part having an average thickness of 5 to 1000 nm and a porous layer which is made of the same material as that of the homogeneous skin layer and is thicker than the homogeneous skin layer, and the porous layer is formed of a structure having voids with an average pore diameter less than 3 $\mu$m. The structure having voids with an average pore diameter less than 3 $\mu$m refers to a fine gap structure rather than a finger void structure (a structure of a conventional membrane which has voids of cylindrical shape or shape similar to the cylindrical shape primarily existing in a porous layer in the direction of its thickness).

In the void structure, when the thickness of the homogeneous skin layer part is (L1), the length (Lx) and width (Ly) of the external rectangular dimensions of a pore in the porous layer parts, which has a thickness (L2=L1×10) and at least 70% open parts, are preferably 10 nm$\leq$Lx$\leq$1000 nm and 10 nm$\leq$Ly$\leq$1000 nm respectively. In other words, the void of the present invention is a gap with an average pore diameter of 1 $\mu$m or less, preferably less than 100 nm.

When the homogeneous skin layer part having thickness (L1) is observed at ×50,000 magnification using a scanning electron microscope with a field emission electron gun (FE-SEM) to produce a binary image in monochrome 256 gradation, the average luminance in 256 gradation of the skin layer part is preferably 100 or more, and the standard deviation is 50 or less. The average luminance of 100 or more and the standard deviation of 50 or less means that the skin layer is homogeneous and no or only a few defect parts (pores) exist, which indicates a preferable semipermeable membrane structure.

When the thickness of the homogeneous skin layer part is (L1), when the porous layer having thickness (L2=L1×10) is observed at ×50,000 magnification using a scanning electron microscope with a field emission electron gun (FE-SEM) to produce a binary image in monochrome 256 gradation, and when a part obtained by image analysis which has an average boundary value (threshold) or less in 256 gradation in the image part is a pore part, preferably, 40% or more of the porous layer is occupied by the pore part. This provides a preferable semipermeable membrane structure that has low permeation resistance even if the permeation amount in the skin layer part is large.

When the homogeneous skin layer part having thickness (L1) and the porous layer part having thickness (L2=L1×10)

are observed at ×50,000 magnification using a scanning electron microscope with a field emission electron gun (FE-SEM) to produce a binary image in monochrome 256 gradation, the average luminance ratio in 256 gradation of the (L1) part to the (L2) part (=luminance (L1)/luminance (L2)) is preferably 1.5 or more. The average luminance ratio (=luminance (L1)/luminance (L2)) of 1.5 or more means that the structures of the skin layer part and the porous layer part distinctly exist, that is, forming a preferable semipermeable membrane.

A protective thin film of elastomer polymer is preferably formed on the skin layer of the polysulfone semipermeable membrane in order to prevent generation of a pinhole, etc. and protect the membrane.

Also, the protective thin film of elastomer polymer in which a crosslinking silicone resin is crosslinked is preferable in terms of strength, durability, etc.

Next, a first method of manufacturing a polysulfone semipermeable membrane of the present invention comprises extruding a solution of a polysulfone resin and an organic solvent (A) having a permittivity of 30 or less and a dipole moment of 3.0 D or less in a tube shape or a hollow yarn shape, or applying the solution to a suitable support, and then dipping the extruded solution or the support with the solution applied in a solution (B) which does not dissolve the polysulfone resin and is miscible with the organic solvent (A) to form a membrane.

A second method of manufacturing a polysulfone semipermeable membrane of the present invention comprises extruding a solution of a polysulfone resin and an organic solvent (C), which has an organic solvent having at least one ether linkage in a molecular structure unit (for example, diethylene glycol diethyl ether) as the principal component (preferably 70 wt. % or more), in a tube shape, or applying the solution to a suitable support, and then dipping the extruded solution or the support with the solution applied in a solution (B), which does not dissolve the polysulfone resin and is miscible with the organic solvent (C), to form a membrane.

In the first manufacturing method, the permittivity of the organic solvent (A) is preferably 10 or less, and the dipole moment is 3.0 D or less.

In the first or second manufacturing method, the organic solvent (A) or (C) preferably comprises at least one solvent selected from diethylene glycol dimethyl ether, diethylene glycol diethyl ether, and a mixed solvent thereof as the principal component.

In the first or second manufacturing method, the solution (B) is preferably at least one solution selected from water, alcohols, and a mixed liquid thereof.

According to the structure of the polysulfone semipermeable membrane of the present invention, the semipermeable membrane of polysulfone resin is formed of a continuous structure of a homogeneous skin layer part having an average thickness of 5 to 1000 nm and a porous layer which is made of the same material as that of the homogeneous skin layer and is thicker than the homogeneous skin layer, and a structure having voids with an average diameter less than 3 μm in the cross section exists in the porous layer. Therefore, a gas separation membrane that has high permeation flux and can be produced at a satisfactory cost can be provided.

Also, according to the first or second manufacturing method of the present invention, a polysulfone semipermeable membrane of the present invention can be obtained efficiently.

BRIEF DESCRIPTION OF THE DRAWINGS

FIG. 4 (a) and (b) are photographs obtained by a scanning electron microscope (SEM) having a field emission (FE) electron gun, showing the structure of a semipermeable membrane in Example 3 of the present invention.

FIG. 5 (a) shows a gray level histogram in the case when the skin layer part (L1) of the semipermeable membrane in Example 1 of the present invention is binarized in 256 gradation by image analysis and the analyzed results.

FIG. 5 (b) shows a gray level histogram in the case when the porous layer part (L1×10) of the semipermeable membrane in Example 1 of the present invention is binarized in 256 gradation by image analysis and the analyzed results.

FIG. 6 (a) shows a gray level histogram in the case when the skin layer part (top layer, 10 nm (L1)) of the semipermeable membrane in Comparative Example 1 of the present invention is binarized in 256 gradation by image analysis and the analyzed results.

FIG. 6 (b) shows a gray level histogram in the case when the porous layer part (L1×10) of the semipermeable membrane in Comparative Example 1 of the present invention is binarized in 256 gradation by image analysis and the analyzed results.

PREFERRED EMBODIMENT OF THE INVENTION

A method of the present invention provides a polysulfone semipermeable membrane structure in which the homogeneous thin film skin layer having gas separation performance equal to or lower than a certain value and the porous layer are integrally formed of the same material to provide enough mechanical strength, the interface between the skin layer and the porous layer is distinct, and the pore diameters in the porous layer do not become gradually larger to provide a sufficient opening rate such that permeation resistance is not caused even if the permeation amount is large. Such a polysulfone semipermeable membrane structure is obtained by a wet phase conversion method for manufacturing a membrane using a specific solvent for making a dope (cast solution).

Figure 1:
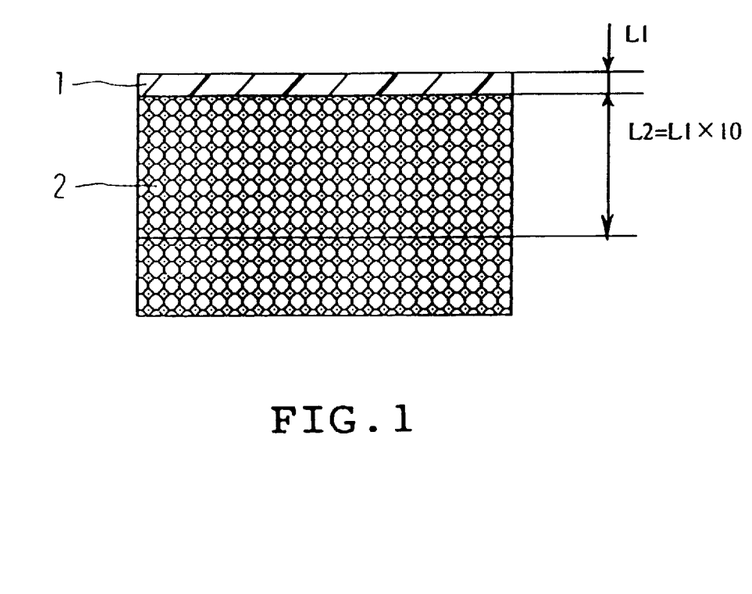
FIG. 1 is a sectional conceptual diagram showing a porous layer part having thickness (L2=L1×10) with respect to the thickness (L1) of a homogeneous skin layer part in an embodiment of the present invention.

The structure of the semipermeable membrane of the present invention is formed of a continuous structure of a homogeneous skin layer part having a thickness of 5 to 1000 nm and a porous layer which is made of the same material as that of the homogeneous skin layer, and the porous layer is formed of a structure having voids with an average pore diameter less than 3 μm in the cross section. Also, in the cross section, as shown in FIG. 1, the length and width (Lx×Ly) of the external rectangular dimensions of a pore in a porous layer part 2 having thickness (L2=L1×10) with respect to the thickness (L1) of a homogeneous skin layer part 1 and at least 70% opening part are 10 nm≦Lx≦1000 nm and 10 nm≦Ly≦1000 nm respectively, and the pore diameters do not become gradually larger. L2=L1 ×10 is defined. Since the determination of the structure requires observing the very thin skin layer part, a scanning electron microscope (SEM), especially a SEM that has a field emission (FE) electron gun (FE-SEM), an atomic force microscope, etc. are preferably used for observing and determining the structure. In order to determine the structure definitely by using these devices, a suitable magnification for observation must be selected according to an object. For identifying a structure having finger voids with a diameter of 3 μm or more in the porous layer, a magnification of ×500 or more is enough. However, for observing the skin layer part and the porous part, especially, a FE-SEM is preferably used at a low accelerating voltage (preferably 1 to 3 KV) at a magnification of ×20,000 or more to obtain an accurate and clear image for analysis. Sample preparation in the FE-SEM observation conforms to a method described in public known literature.

In order to characterize the structure of the semipermeable membrane obtained in the present invention more definitely, a method of capturing a FE-SEM image on a computer to perform image analysis is preferably used. Software for image analysis should not be limited to specific software if the software is commercially available. In image analysis, contrast, focus, halation, etc. of a FE-SEM image captured on a computer significantly effect digitization of the image.

In order to eliminate random contrast, focus, halation, etc. of the SEM image, the automation function provided in the SEM is preferably used.

In performing image analysis on a FE-SEM image, the magnification for the SEM image is preferably ×20,000 or more, most preferably ×50,000, to obtain an accurate and clear image for analysis. While a way to capture the obtained SEM image on a computer should not be specifically limited, the SEM image is preferably captured directly from the FE-SEM screen, or captured from a FE-SEM photograph using a scanner.

The obtained image is produced as a binary image in monochrome 256 gradation for image processing. To digitize the structure of the semipermeable membrane obtained in the present invention, the following method will be illustrated by way of example referring to FIG. 2.

A. Skin layer part

Figure 2:
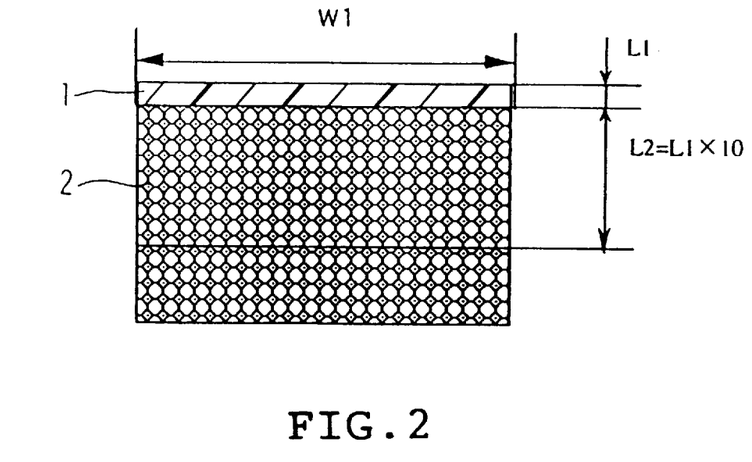
FIG. 2 is a view for explaining digitizing of the structure of a semipermeable membrane of an embodiment of the present invention.

The cross section of the semipermeable membrane is observed at a magnification of ×50,000 using a FE-SEM to be produced as a binary image in monochrome 256 gradation. A skin layer part 1 is identified on the FE-SEM image, and the thicknesses of at least ten random sites in a part having a length (W1) of 500 to 1500 nm in skin layer part 1 seen on the image are measured to determine (L1) as an average value. (L1×W1) part is specified on the image, a luminance histogram of the part is made, and the average value and standard deviation of luminance are calculated. When the skin layer part exists clearly and has few defect parts, the standard deviation of luminance is small. For a preferable semipermeable membrane structure, the average luminance in 256 gradation of the skin layer part is preferably 100 or more, and the standard deviation is 50 or less.

When the average value of luminance is less than 100, and the standard deviation is more than 50, the skin layer part is not homogeneous and has many defect parts (pores), which is not a preferable semipermeable membrane structure.

B. Porous layer part

The cross section part of porous layer 2 having thickness (L2=L1 ×10) with respect to the average thickness (L1) of homogeneous skin layer part 1 is observed at a magnification of ×50,000 using a FE-SEM, and produced as a binary image in monochrome 256 gradation. By determining the average of luminance in 256 gradation of this image part as the boundary value (threshold), a part having luminance equal to or higher than the average value is extracted as a non-opening part, and the proportion of the extracted part with respect to the whole, (M1%), is calculated by a computer. The proportion of a part except this part, (1–M1%), is defined as the proportion of a pore part within a certain range in any cross section (opening rate). When the opening rate is large, permeation resistance is unlikely to occur even if the permeation amount is large. Therefore, the opening rate is preferably 40% or more. When the opening rate of a part under the skin layer is less than 40%, permeation resistance is caused if the permeation amount in the skin layer part is large, which is not a preferable semipermeable membrane structure.

C. Skin layer part and porous layer part

Using the average luminances of the skin layer part (L1) and the porous layer part (L2), the average luminance ratio (luminance (L1)/luminance (L2)) is calculated. As the average luminance ratio becomes smaller, the skin layer part is formed with pores having a smaller size. For a preferable semipermeable membrane in which the structures of the skin layer part and the porous layer part definitely exist, the average luminance ratio of the skin layer part to the porous layer part is preferably 1.5 or more.

A method of manufacturing an asymmetric gas separation membrane of polysulfone of the present invention comprises extruding a solution of a polysulfone resin and an organic solvent (A) having a permittivity (dielectric constant) of 30 or less and a dipole moment of 3.0 D or less or a solution of a polysulfone resin and an organic solvent (C), which has an organic solvent having at least one ether linkage in a molecular structure unit as the principal component, in a tube shape or a hollow yarn shape, or applying the solution to a suitable support. Then the extruded solution or the support with the solution applied is dipped in a solution (B) which does not dissolve the polysulfone resin and is miscible with the organic solvent (A) or (C).

The polysulfone resin used in the present invention should not be limited to a specific polysulfone resin if the polysulfone resin has at least one (—SO$_2$—) group in a molecular structure as shown in the following formula (I).

Formula (I)

wherein, R indicates divalent aromatic, alicyclic, or aliphatic hydrocarbon group, or a divalent organic group in which these hydrocarbon groups are bonded with a divalent organic bonding group.

Preferably, polysulfone of the structural formulae shown in the following formulae (II) are used.

Formulae (II)

The polysulfone resin used in the present invention may be used individually, or it may be used as a composition of two or more thereof. Also, other polymers such as polyimide and polyimide resin containing fluorine may be added at amounts of 50 mole % or less, thus providing a copolymer or a composition.

When a dope for manufacturing a membrane is prepared by dissolving a polysulfone resin in an organic solvent (A) having a permittivity of 30 or less and a dipole moment of 3.0 D or less or an organic solvent (C) having an organic solvent having at least one ether linkage in a molecular structure unit as the principal component, the concentration of polysulfone is 3 to 40 wt. %, preferably 10 to 30 wt. %. Also, when the dope for manufacturing a membrane is prepared, a swelling agent, a dispersing agent, a thickener, etc. may be added as required.

While the permittivity of the organic solvent (A) used in the present invention is 30 or less, and the dipole moment is 3.0 D or less, the permittivity is more preferably 10 or less. Since the organic solvent (A) or (C) used in the present invention has a small polarity, the organic solvent is mixed sufficiently with the solution (B) used as a solidifying liquid, however, the affinity is low. Based on this property, when the organic solvent (A) or (C) is contacted with the solution (B), an interface is temporarily formed. In manufacturing a membrane by wet phase conversion, the skin layer is formed using this interface. Therefore, a membrane can be manufactured on a industrial scale without a pinhole being formed in a broad range of the homogeneous skin layer.

The organic solvent (A) used in the present invention need not be limited to a specific organic solvent as long as the organic solvent satisfies the above conditions. However, diethylene glycol dimethyl ether (the permittivity is 5.97, and the dipole moment is 1.97 D) is preferable used, and 1,2-dimethoxyethane (the permittivity is 5.50, and the dipole moment is 1.79 D), etc. may be used. These may be used as a mixed solvent in addition to being used individually. Also, 30 wt. % or less of an aprotic solvent which has a permittivity more than 30 and/or a dipole moment more than 3.0 D may be added to control the solubility of polysulfone and the viscosity of the dope. When the above aprotic solvent is added, the organic solvent (A) is selected according to the aprotic solvent, however, the most preferable organic solvent (A) used in the present invention is an organic solvent which contains 60 to 100 wt. % of diethylene glycol dimethyl ether. For example, a mixed solution of 67 wt. % of diethylene glycol dimethyl ether and 33 wt. % of N-methylpyrrolidone (NMP) is illustrated.

When dipolar aprotic solvents such as N-methyl-2-pyrrolidone (the permittivity is 320 (25° C.), and the dipole moment is 4.00 D (30° C.)), N,N-dimethylacetamide (the permittivity is 37.8 (25° C.), and the dipole moment is 3.72 D), N,N-dimethylformamide (the permittivity is 36.7 (25° C.), and the dipole moment is 3.86 D (25° C.)), and dimethyl sulfoxide (the permittivity is 48.9 (20° C.), and the dipole moment is 4.30 D) which are conventionally used as a solvent for a dope are used, the permittivity is 32 or more, and the dipole moment is 3.7 D or more. Therefore the affinity for a solvent used as a solidifying liquid, for example, water, is high. Due to the high affinity, an interface is not formed between the both of the solvents, and the speed at which the solvent for a dope leaches into the solvent used as a solidifying liquid is faster than the speed at which the skin layer is formed in manufacturing a membrane by wet phase conversion. Therefore, a pinhole is formed in a broad range of the homogeneous skin layer. Also, with the conventional dipolar aprotic solvent as mentioned above, after a dope for manufacturing a membrane is cast on a gas permeable support or spun, the dope is left at a predetermined temperature for a predetermined period so that a part of the solvent is evaporated in manufacturing a membrane by wet phase conversion. However, the dipolar aprotic solvent has an extremely high affinity for water, so that it absorbs moisture in the air, and the surface becomes cloudy with a color of white, facilitating pinhole formation.

The organic solvent (C) used in the present invention need not be limited to a specific organic solvent if the organic solvent contains an organic solvent having at least one ether linkage in a molecular structure unit as the primary component. Examples of such organic solvents preferably include those having the following formula:

wherein n is 2 to 5, and R or R' is an alkyl group having $C_{1-6}$, and more preferably include diethylene glycol dimethyl ether, diethylene glycol diethyl ether, diethylene glycol dibutyl ether, and triethylene glycol diethyl ether. Further, examples of such organic solvents preferably include those having the following formula:

wherein n is 2 to 5, and R or R' is an alkyl group having $C_{1-6}$, and more preferably include 1,2-dimethoxyethane, 1,2-diethoxyethane, and 1,2-dibutoxyethane. These can be used as a mixed solvent in addition to being used independently. Also, 30 wt. % or less of an aprotic solvent which does not have an ether linkage in a molecular structure unit may be added to control the solubility of polysulfone and the viscosity of the dope. These organic solvents also have the same properties as those of the organic solvent (A) with respect to the solidifying liquid (B).

A method of manufacturing a membrane by wet phase conversion using the above dope will be described below. The method of manufacturing the semipermeable membrane and the membrane form in the present invention should not be specifically limited. However, when the dope of the organic solvent (A) or (C) used in the present invention is dipped in the solidifying liquid, the solution (B), by extrusion, casting, etc., an asymmetric membrane in the shape of a tube (including a hollow yarn), a flat film, etc., is obtained.

For a flat film shape, it is preferable to obtain an asymmetric membrane in a composite membrane form by applying the dope to a gas permeable support by casting, dipping, etc., and then dipping the gas permeable support with the dope applied in the solidifying liquid, the solution (B), in order to increase mechanical strength. Examples of suitable supports used in the present invention include a glass sheet that has a smooth surface, the following gas permeable supports, etc. Examples of the above gas permeable supports include organic, inorganic, or metal porous member, woven fabric, and non-woven fabric. The thickness of the dope applied to these gas permeable supports is 25 to 400 μm, preferably 30 to 200 μm.

A membrane is manufactured using the dope of the organic solvent (A) in the present invention at a temperature of −80° to 80° C., preferably −20° to 40° C.

The solidifying liquid which is used when the above organic solvent (A) is dipped in and removed, i.e., the solution (B), need not be limited to a specific solidifying liquid as long as the solidifying liquid does not dissolve a polysulfone resin and is miscible with the above organic solvent (A). Examples of the solidifying liquids include water, alcohols such as methanol, ethanol, isopropyl alcohol, and a mixed liquid thereof, and water is preferably used. The temperature of the solidifying liquid, i.e., the solution (B), when the above organic solvent (A) is dipped in and removed need not be limited to a specific temperature, however, the temperature is preferably 0° to 50° C.

By manufacturing an asymmetric membrane according to the above conditions, a gas separation membrane in which the homogeneous skin layer has a substantially constant thickness of about 1,000 nm or less and does not have a pinhole that largely deteriorates separation performance over a wide range can be manufactured.

In the semipermeable membrane obtained in the present invention, preferably, an elastomer polymer is further applied to the skin layer surface. Forming a thin film of elastomer polymer for lamination is preferable for filling in the defects of the surface of the above gas separation membrane as well as preventing the surface from being scratched. The above elastomer polymer refers to a polymer that can form a flexible film. Examples of such polymers include polypropylene, poly(vinyl chloride), ethylene-propylene copolymer, ethylene-propylene-diene copolymer, polybutadiene, polyisoprene, chloroprene rubber, poly(4-methyl-pentene-1), butadiene-styrene copolymer, isoprene-isobutylene copolymer, and polyisobutylene. These polymers are the homopolymers or copolymers of ethylene monomer or conjugated diene monomer. Further, examples of the elastomer polymers may include copolymers containing a monomer component having a functional group such as acrylonitrile, (meth)acrylate, and (meth)acrylic acid in addition to the above monomer components, and copolymers having both a soft segment and a hard segment such as polyether polyol, polyurethane polyether, polyurethane polyester, and polyamide polyether. Further, a straight-and-long chain epoxy resin cured by a curing agent, ethyl cellulose, a butoxy resin, etc. may be used as the elastomer polymer in the present invention. A crosslinking silicone resin is most preferably used as the elastomer polymer in the present invention. Such a crosslinking silicone resin is soluble in an organic solvent before crosslinking. However, after crosslinking, the silicone resin becomes insoluble in the organic solvent. A membrane may be manufactured using this crosslinking silicone resin according to a method described in Laid-open Japanese Patent Application No. (Tokkai sho) 59-225705, for example.

An element form of the above polysulfone semipermeable membrane should not be limited to a specific element form, however, the polysulfone semipermeable membrane may be formed into a module as a hollow yarn type element when extruded in a tube shape, and the polysulfone semipermeable membrane may be formed into a module as a spiral type, a flat film type, or a tubular type element, for example, when applied to a suitable support.

The following examples will be described to illustrate the present invention. However, the invention should not be limited to the specific examples.

EXAMPLE 1

82 parts by weight of diethylene glycol dimethyl ether was added to 18 parts by weight of polysulfone having a repeating unit expressed in the formula (2) for dissolution at 60° C., and the resultant solution was filtered, and left standing still to be fully defoamed for preparation.

The above solution for manufacturing a membrane was cast on a support layer of polyester non-woven fabric to a thickness of 200 μm using an applicator in an atmosphere at a temperature of 25° C., dipped in water as a solidifying liquid in a first vessel at a temperature of 25° C. for 5 minutes and then in water in a second vessel at a temperature of 25° C. for 1 hour, and dried at a temperature of 100° C. for 32 minutes to be used for measurement. The measurement was made by reducing the pressure to 10 torr or less at the permeation side using the following pure gases: $CO_2$, $CH_4$, and $N_2$. The measurement temperature was 25° C. The results are shown in Table 1.

TABLE 1

| Gas for measurement | Pressure at pressing side [kgf/cm$^2$] | Permeation speed [Nm$^3$/m$^2$/h/atm] | Separation performance [$CO_2$/X] |
|---|---|---|---|
| $CO_2$ | 1 | 0.1 | — |
| $CH_4$ | 1 | 0.008 | 12.5 |
| $N_2$ | 1 | 0.010 | 10.0 |

As is apparent from Table 1, the polysulfone semipermeable membrane of this embodiment was excellent in permeation speed and separation performance.

Figure 5:
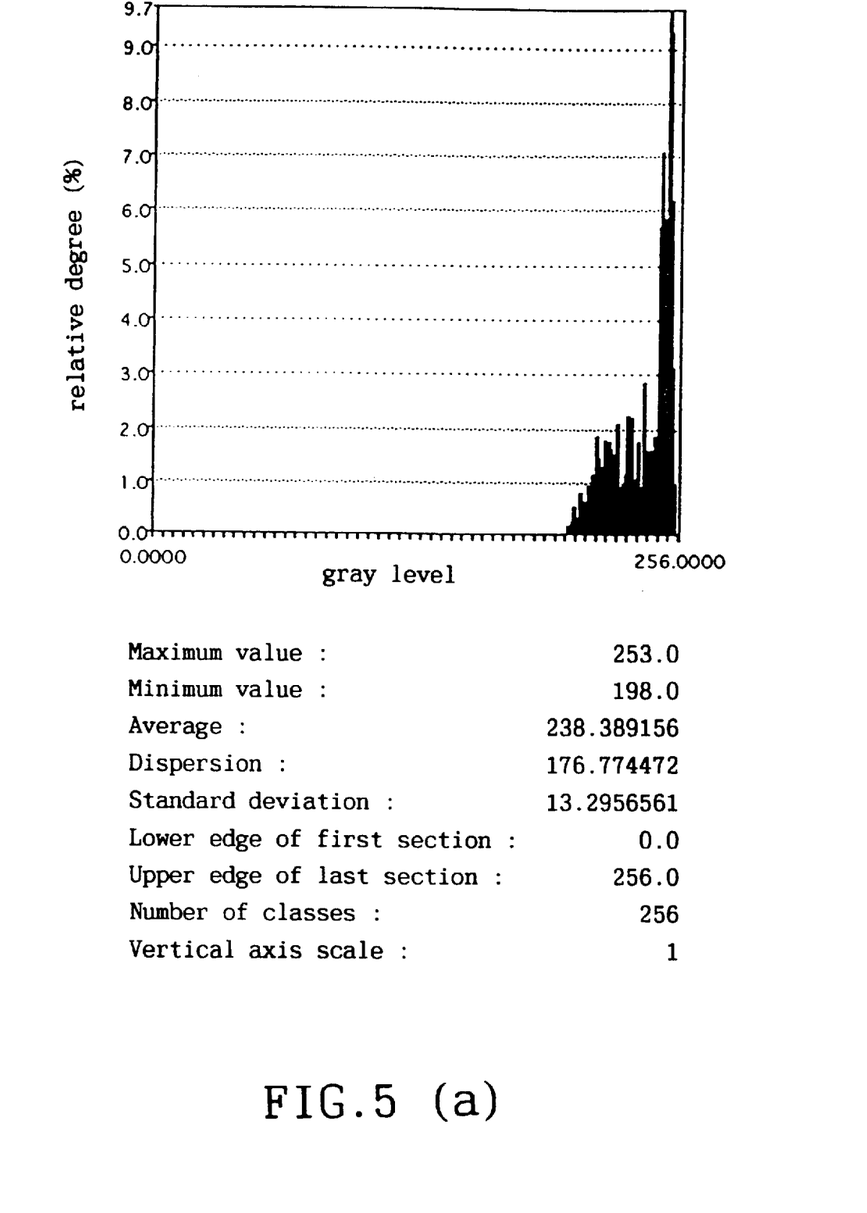

FIG. 5 (a) shows a gray level histogram in the case when the skin layer part (L1) of the semipermeable membrane in Example 1 of the present invention is binarized in 256 gradation by image analysis and the analyzed results. FIG. 5 (b) shows a gray level histogram in the case when the porous layer part (L1×10) of the semipermeable membrane in Example 1 of the present invention is binarized in 256 gradation by image analysis and the analyzed results.

EXAMPLE 2

Figure 3:
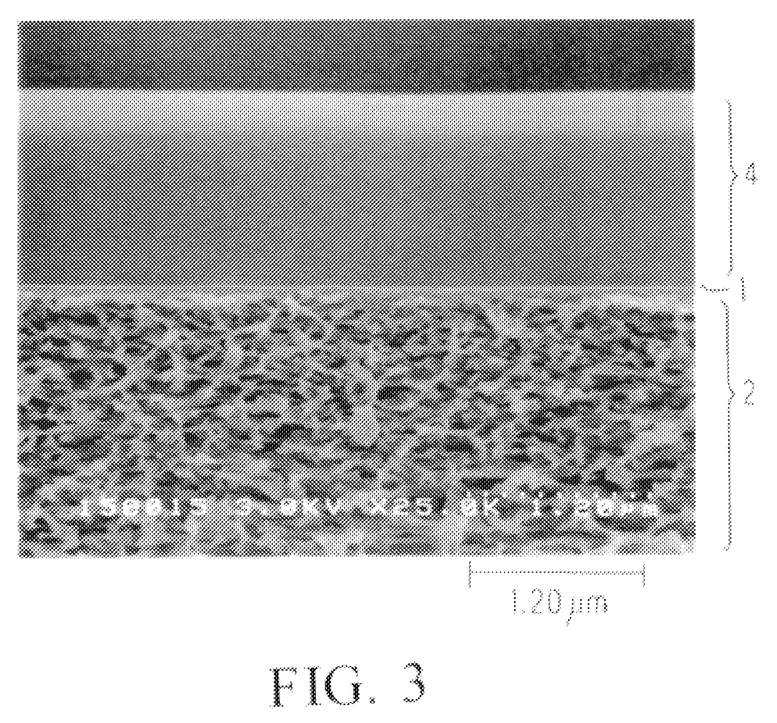
FIG. 3 is a photograph obtained by a scanning electron microscope (SEM) having a field emission (FE) electron gun, showing the structure of a semipermeable membrane in Example 2 of the present invention.

A solution of elastomer polymer of crosslinking silicone resin (a solution with 3 wt. % of RTV615 hexane manufactured by GE Silicones) was applied to the surface of the polysulfone semipermeable membrane obtained in Example 1, heat treated at a temperature of 110° C. for 15 minutes to form a thin film of the elastomer polymer for lamination. The obtained membrane is illustrated in FIG. 3 showing a FE-SEM photograph. In FIG. 3, a porous layer 2 is formed on a support layer of polyester non-woven fabric (not shown), a skin layer 1 is formed on the surface of porous layer 2, and a protective layer 4 of an elastomer polymer layer is formed on skin layer 1. Measurement was made similarly as in Example 1, and the results are shown in Table 2.

TABLE 2

| Gas for measurement | Pressure at pressing side [kgf/cm$^2$] | Permeation speed [Nm$^3$/m$^2$/h/atm] | Separation performance [$CO_2$/—] |
|---|---|---|---|
| $CO_2$ | 1 | 0.08 | — |
| $CH_4$ | 1 | 0.004 | 20 |
| $N_2$ | 1 | 0.006 | 13.3 |

As is apparent from Table 2, the polysulfone semipermeable membrane of this embodiment was excellent in permeation speed and separation performance.

EXAMPLE 3

After the polysulfone semipermeable membrane used in Example 1 was separated from the non-woven fabric and dipped in 30 vol. % ethanol aqueous solution, the polysulfone semipermeable membrane was freeze-broken in liquid nitrogen, and its cross section was observed by a FE-SEM (HITACHI, S-4000; an accelerating voltage of 3 KV). The obtained FE-SEM photograph was captured on a computer using a scanner (Canon, IX-4015) and subjected to image analysis using Mac SCOPE as image processing software.

Figure 4A:
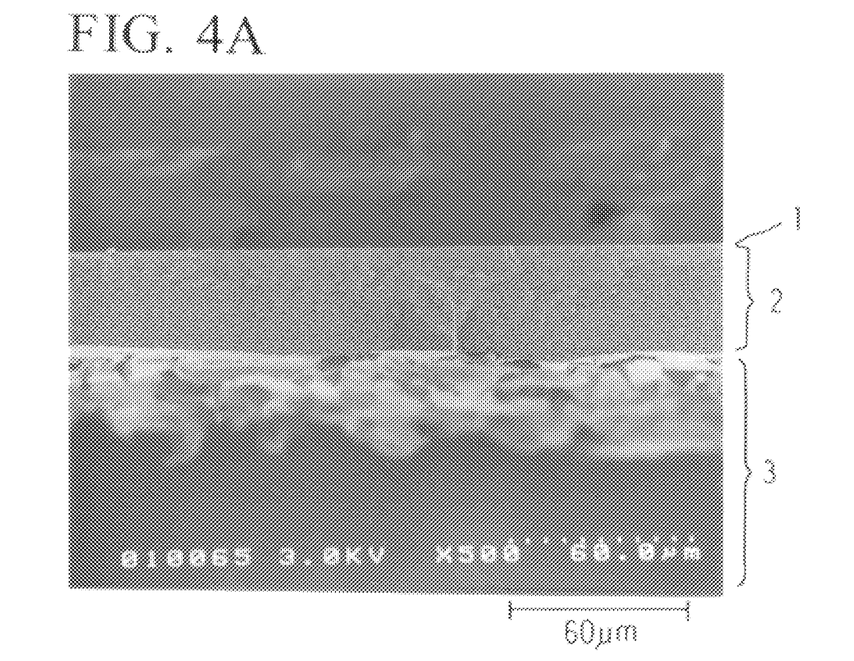
Figure 4B:
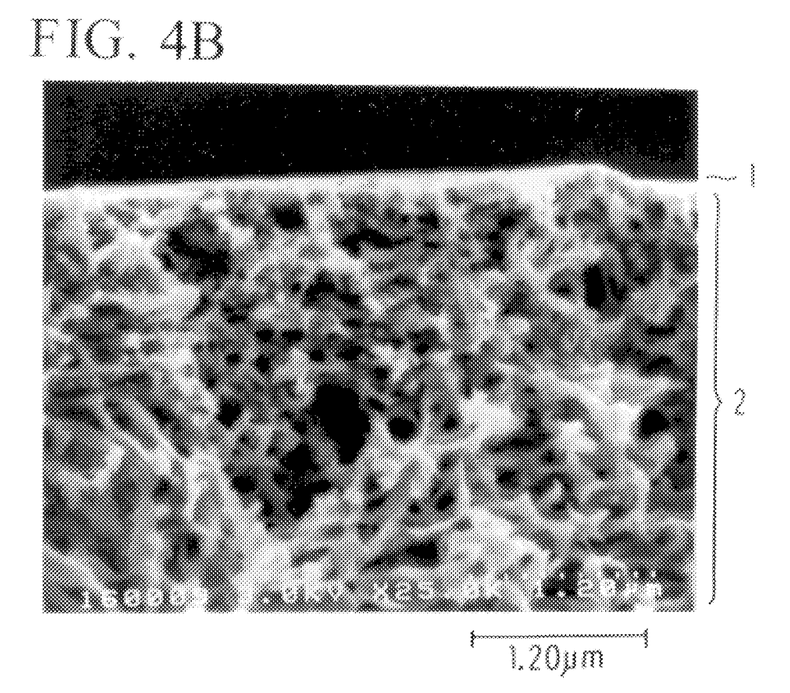

The FE-SEM photographs are shown in FIG. 4 (a) and (b), and the results of the image analysis are shown in Table 3. In FIG. 4 (a) and (b), a structure having finger voids with a diameter of 3 μm or more in porous layer 2 is not identified. FIG. 4 (a) is a FE-SEM photograph at ×500 magnification, and FIG. 4 (b) is a FE-SEM photograph at ×25,000 magnification, wherein 1 indicates a skin layer, 2 indicates a porous layer, and 3 is a part in which a support layer of polyester non-woven fabric is removed for taking out a sample for photograph observation. A black part over skin layer 1 is a space.

Comparative Example 1

A membrane was similarly manufactured as in Example 1 except that polysulfone is dissolved using N-methyl-2-pyrrolidone, and permeation measurement was made. The performance of gas separation for $CO_2$ and $CH_4$ ($CO_2/CH_4$) was <1, and therefore the membrane did not have separation performance.

The results analyzed similarly as in Example 3 are also shown in Table 3.

TABLE 3

| | Example 3 | Comparative Example 1 |
|---|---|---|
| Thickness of skin layer (L1) | 30 nm | nonexistent |
| Average luminance of skin layer | 230.4 | 120.0* |
| Standard deviation of luminance of skin layer | 33.3 | 72.0 |
| Average luminance of porous layer (L2) | 120.9 | 119.5 |
| Opening rate of porous layer (threshold: 121) | 56% | 30% |
| Average luminance of skin layer/ average luminance of porous layer | 1.9 | 1.0 |

*Assuming top layer to be 10 nm

Figure 6:
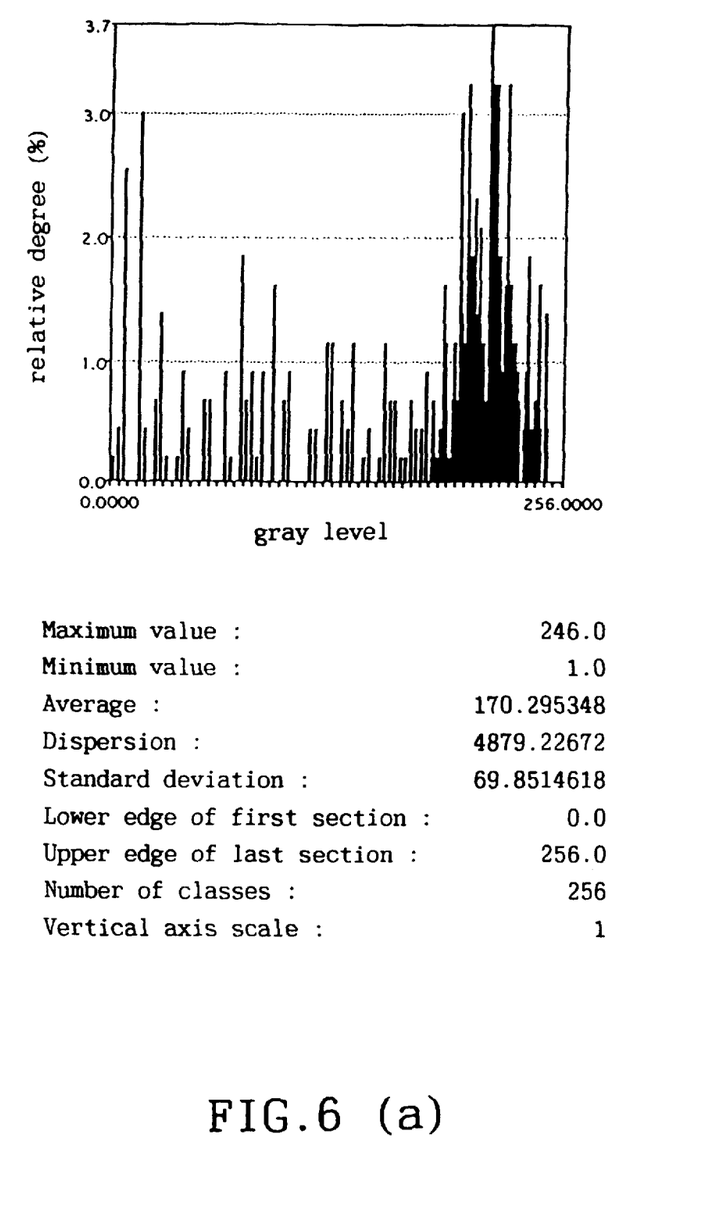
Figure 7:
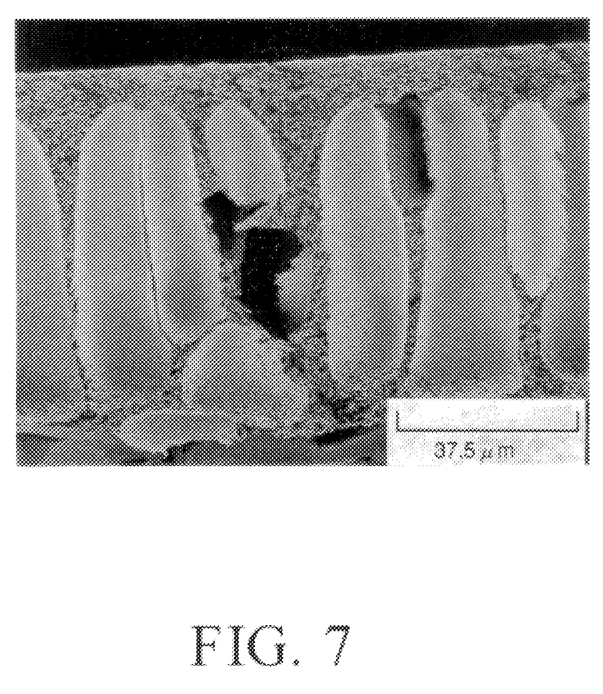
FIG. 7 shows a photograph obtained by a scanning electron microscope (SEM) having a field emission (FE) electron gun, showing the structure of the semipermeable membrane in Comparative Example 1 of the present invention.

FIG. 6 (a) shows a gray level histogram in the case when the skin layer part (top layer, 10 nm (L1)) of the semipermeable membrane in Comparative Example 1 of the present invention is binarized in 256 gradation by image analysis and the analyzed results. FIG. 6 (b) shows a gray level histogram in the case when the porous layer part (L1×10) of the semipermeable membrane in Comparative Example 1 of the present invention is binarized in 256 gradation by image analysis and the analyzed results. FIG. 7 shows a photograph obtained by a scanning electron microscope (SEM) having a field emission electron gun, showing a structure of the semipermeable membrane in Comparative Example 1 of the present invention. As is apparent from FIG. 7, the structure does not have a skin layer and has finger voids having a diameter of 3 μm or more.

As mentioned above, the polysulfone semipermeable membrane of the present invention comprises the semipermeable membrane of polysulfone resin formed of a continuous structure of a homogeneous skin layer part having an average thickness of 5 to 1000 nm and a porous layer which is made of the same material as that of the homogeneous skin layer and is thicker than the homogeneous skin layer, and the porous layer is formed of a structure having voids with an average pore diameter less than 3 μm. Therefore, a gas separation membrane that has high permeation flux and can be produced for a satisfactory cost can be provided.

Also, in the present invention, a gas separation membrane that has high permeation flux and can be produced for a satisfactory cost can be obtained by forming a thin film skin layer having a gas separation function without a defect by a more simple and industrial method.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A polysulfone semipermeable membrane comprising a semipermeable membrane of polysulfone resin formed of a continuous structure of a homogeneous skin layer having an average thickness of 5 to 1000 nm and a porous layer which is made of the same material as that of said homogeneous skin layer and is thicker than said homogeneous skin layer, wherein said porous layer is formed of a structure having voids with an average pore diameter less than 3 μm.

2. The polysulfone semipermeable membrane according to claim 1, wherein, in the void structure, when the thickness of the homogeneous skin layer is (L1), and a length (Lx) and width (Ly) are the external rectangular dimensions of a pore in a porous layer having thickness (L2=L1×10), at least 70% of the opening parts satisfy 10 nm≦Lx≦1000 nm and 10 nm≦Ly≦1000 nm respectively.

3. The polysulfone semipermeable membrane according to claim 1, wherein, when the homogeneous skin layer having thickness (L1) is observed at ×50,000 magnification using a scanning electron microscope with a field emission electron gun (FE-SEM) to produce a binary image in monochrome 256 gradation, the average luminance in 256 gradation of the skin layer is 100 or more, and the standard deviation is 50 or less.

4. The polysulfone semipermeable membrane according to claim 1, wherein, when the thickness of the homogeneous skin layer is (L1), when the porous layer having thickness (L2=L1×10) is observed at ×50,000 magnification using a scanning electron microscope with a field emission electron gun (FE-SEM) to produce a binary image in monochrome 256 gradation, and when a part obtained by image analysis which has an average boundary value (threshold) or less in 256 gradation in the image is a pore part, 40% or more of the porous layer is occupied by the pore part.

5. The polysulfone semipermeable membrane according to claim 1, wherein, when the homogeneous skin layer having thickness (L1) and the porous layer having thickness (L2=L1×10) are observed at ×50,000 magnification using a scanning electron microscope with a field emission electron gun (FE-SEM) to produce a binary image in monochrome 256 gradation, the average luminance ratio in 256 gradation of the (L1) part to the (L2) part (=luminance (L1)/luminance (L2)) is 1.5 or more.

6. The polysulfone semipermeable membrane according to claim 1, wherein a protective thin film of elastomer polymer is further formed on the skin layer of the polysulfone semipermeable membrane.

7. The polysulfone semipermeable membrane according to claim 6, wherein the protective thin film of elastomer polymer is a layer in which a crosslinkable silicone resin is crosslinked.

* * * * *